United States Patent
Wang et al.

(10) Patent No.: US 7,318,658 B2
(45) Date of Patent: Jan. 15, 2008

(54) HIGH POWER LED COLOR BULB WITH INFRARED REMOTE FUNCTION

(75) Inventors: Hsu Cheng Wang, Kaohsiung (TW); Wei Rur Chen, Taipei County (TW); Chin Feng Su, Kaohsiung (TW); Ting Feng Wu, Kaohsiung County (TW)

(73) Assignees: Anteya Technology Corporation, Niaosong Hsiang, Kaohsiung County (TW); Color Stars, Inc., Sindian, Taipei County (TW)

( * ) Notice: Subject to any disclaimer, the term of this patent is extended or adjusted under 35 U.S.C. 154(b) by 64 days.

(21) Appl. No.: 11/332,599

(22) Filed: Jan. 12, 2006

(65) Prior Publication Data

US 2007/0091597 A1 Apr. 26, 2007

(30) Foreign Application Priority Data

Jan. 6, 2005 (TW) .............................. 94100317 A

(51) Int. Cl.
*F21V 33/00* (2006.01)
*F21V 23/00* (2006.01)
*H05B 37/02* (2006.01)

(52) U.S. Cl. ...................... 362/253; 362/276; 362/800; 315/150

(58) Field of Classification Search ................ 362/276, 362/640, 646, 650, 800, 253; 315/149, 150
See application file for complete search history.

(56) References Cited

U.S. PATENT DOCUMENTS

| | | | | |
|---|---|---|---|---|
| 5,585,697 A | * | 12/1996 | Cote et al. .................. | 315/157 |
| 5,823,660 A | * | 10/1998 | Hsu ............................. | 362/276 |
| 6,149,283 A | * | 11/2000 | Conway et al. ............. | 362/236 |
| 6,294,873 B1 | * | 9/2001 | Yu ............................... | 315/149 |
| 6,614,126 B1 | * | 9/2003 | Mitchell ..................... | 307/9.1 |
| 2002/0021573 A1 | * | 2/2002 | Zhang ........................ | 362/555 |
| 2003/0043586 A1 | * | 3/2003 | Sagal et al. ................. | 362/341 |
| 2003/0107888 A1 | * | 6/2003 | Devlin et al. ............... | 362/233 |
| 2005/0099319 A1 | * | 5/2005 | Hutchison et al. .......... | 340/908 |
| 2006/0012997 A1 | * | 1/2006 | Catalano et al. ............ | 362/253 |
| 2006/0109649 A1 | * | 5/2006 | Ducharme et al. .......... | 362/231 |
| 2006/0181416 A1 | * | 8/2006 | CHen ....................... | 340/545.2 |
| 2006/0238136 A1 | * | 10/2006 | Johnson, III et al. ... | 315/185 R |
| 2007/0081346 A1 | * | 4/2007 | Spinello ..................... | 362/394 |
| 2007/0195544 A1 | * | 8/2007 | Graves, Jr. .................. | 362/510 |

* cited by examiner

*Primary Examiner*—Jong-Suk (James) Lee
*Assistant Examiner*—David R Crowe
(74) *Attorney, Agent, or Firm*—patenttm.us; James H. Walters

(57) ABSTRACT

A high power LED color bulb with infrared remote function has a reflector having front and rear openings and a light guide hole, a light guide bar received inside light guide hole, an LED module with LED chips and a bulb cover with a controlling circuit board. The LED module is mounted on a rear end of the reflector with the LED chips inside the reflector. The controlling circuit board is inside the bulb cover, is connected electronically to the LED module and has an infrared sensor aligned with the light guide bar of the reflector. When an infrared signal comes through the front opening of the reflector, the infrared signal passes through the light guide bar and is received by the infrared sensor. Since the infrared sensor is behind the reflector and the LED chips, the infrared sensor avoids overheating from heat produced by the LED chips and does not have to be replaced simultaneously with the color bulb.

7 Claims, 8 Drawing Sheets

US 7,318,658 B2

HIGH POWER LED COLOR BULB WITH INFRARED REMOTE FUNCTION

BACKGROUND OF THE INVENTION

1. Field of the Invention

This invention relates to an LED lamp, and especially for a high power LED color bulb with an infrared remote function.

2. Description of the Related Art

The function of LEDs has changed from the earliest stage that was only provided a single color light or display panel. Nowadays, it applies to illuminating facilities, such as projecting light . . . etc.

Using the projecting light as an example, the projecting light has a main bulb cover, a circuit board inside of the bulb cover, a reflector mounted in front of the bulb cover, multiple high power LED elements mounted on the circuit board and an external switch electronically connected to the circuit board. When the projecting light is mounted on a ceiling or walls, people can turn the light on or off by the switch.

However, the LED lamps' structure has the following disadvantages:

1. Because a traditional lamp only has a single color bulb, it only requires a switch to turn the color bulb on and turn off. However, using a high power LED color bulb instead of a traditional single color bulb in the lamps does not allow a traditional controller to be used, since the high power LED color bulb has several different color modes (e.g. 16 colors). Therefore, a remote controller is required when the lamp uses a high power LED color bulb.

2. If a conventional single color bulb is to be changed to a color bulb, the lamp with the color bulb still does not have an infrared remote function unless an infrared receiver is mounted inside the lamp. Therefore, an infrared remote function cannot be incorporated into a conventional lamp by installing a high power LED color bulb.

SUMMARY OF THE INVENTION

The main purpose of the invention is to provide a high power LED color bulb that includes an infrared remote function.

The high power LED color bulb has a reflector having a front and a rear opening and a light guide hole, a light guide bar received inside light guide hole, an LED module with LED chips and a bulb cover with a controlling circuit board. The LED module is mounted on a rear end of the reflector with the LED chips inside the reflector. The controlling circuit board is inside the bulb cover, is connected electronically to the LED module and has an infrared sensor aligned with the light guide bar of the reflector. When an infrared signal comes through the front opening of the reflector, the infrared signal passes through the light guide bar and is received by the infrared sensor. Since the infrared sensor is behind the reflector and the LED chips, the infrared sensor avoids overheating from heat produced by the LED chips and does not have to be replaced simultaneously with the color bulb.

DETAILED DESCRIPTION OF THE INVENTION

Figure 1:
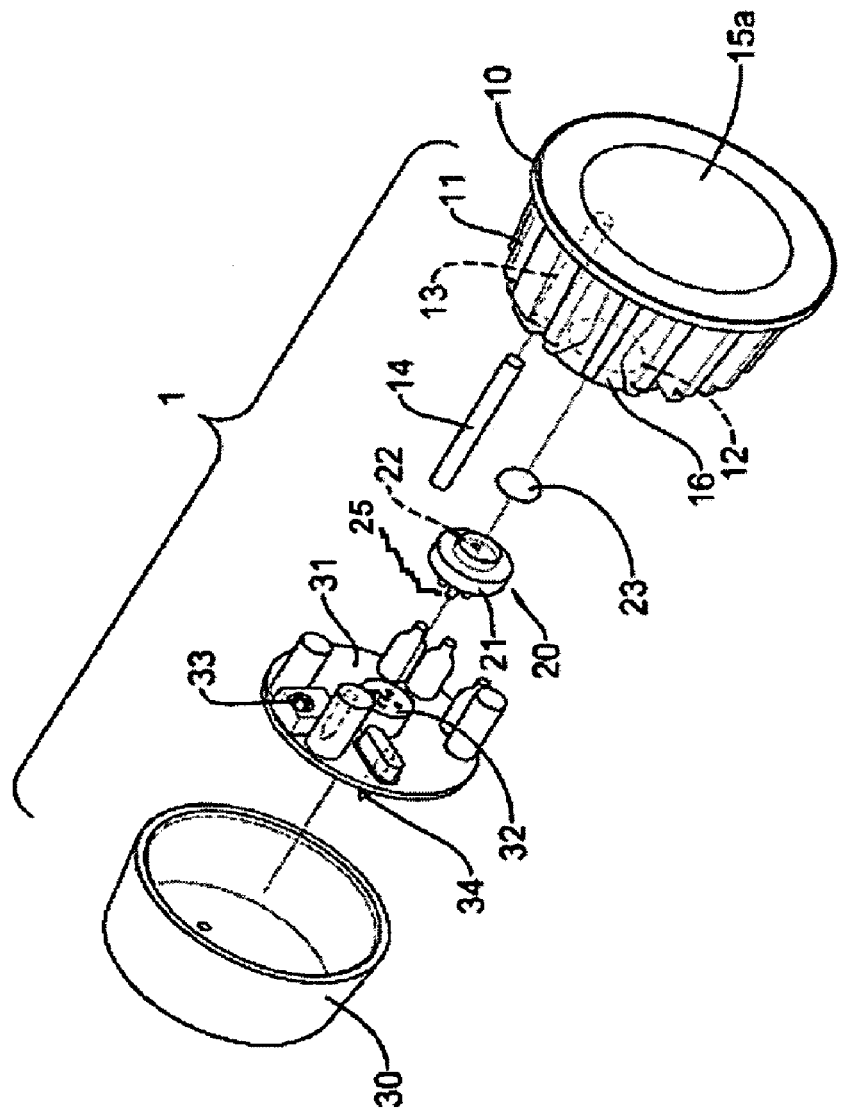
FIG. 1 is an exploded perspective view of a first embodiment of a high power LED color bulb in accordance with the present invention.

With reference to FIG. 1, a first embodiment of a high power LED color bulb (1) has a reflector (10), an LED module (20) and a bulb cover (30).

Figure 5:
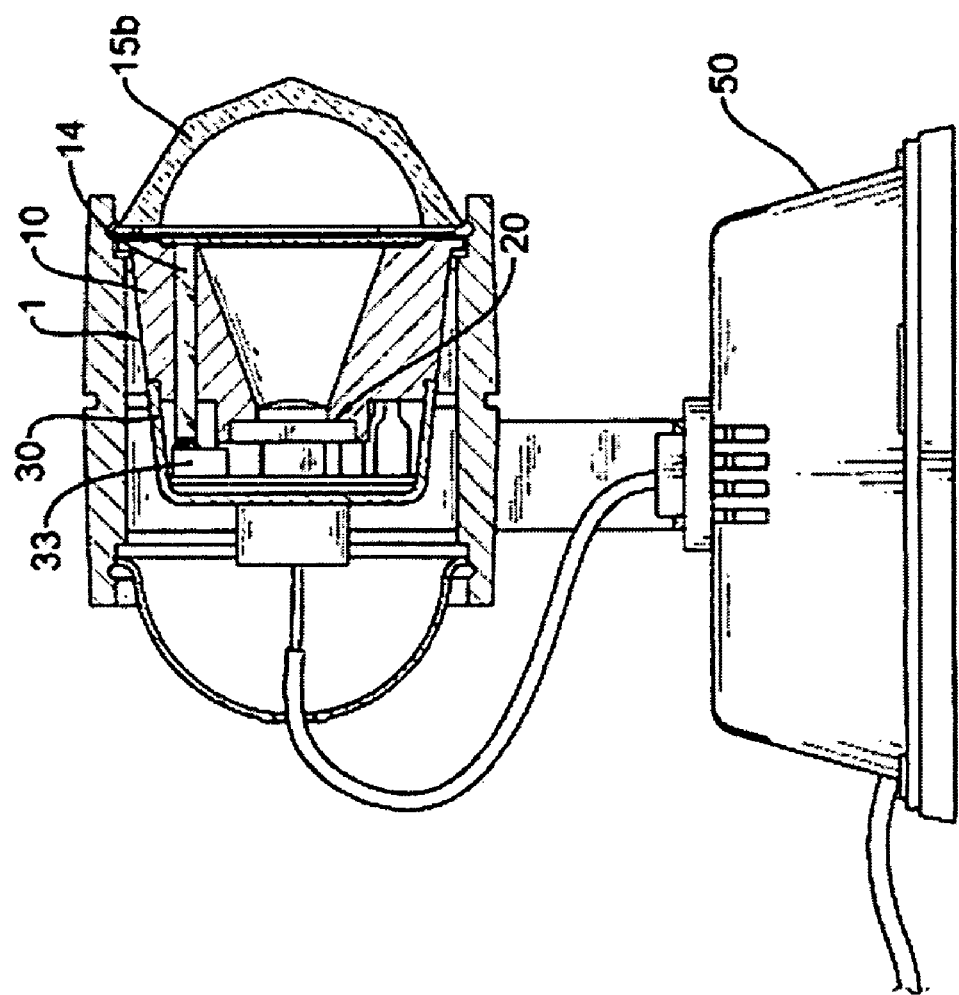
FIG. 5 is a side view in partial section of another projecting lamp.

The reflector (10) has a body, multiple radiator fins (11), a reflecting inside, a reflector joint (16), a light guide hole (13), an optional light guide bar (14) and an optional penetrating light sheet (15a). The body could be formed in a horn or a bowl shape and made of metal, plastic or other materials with high thermal conductivity and has a front, a rear and a front opening. The multiple radiator fins (11) are formed outside the body to radiate heat from the reflector (10). The reflector joint (16) is formed on the rear of the body and has a central penetrating hole (12). The light guide hole (13) is defined through the body from the front to the rear. The light guide bar (14) is held inside the light guide hole (13). The penetrating light sheet (15a) covers the front opening of the body to allow light go through. With further reference to FIG. 5, the penetrating light sheet (15a, 15b) could be flat or convex with multiple sides.

The LED module (20) is screwed onto the reflector joint (16) and has a stand (21), multiple LED chips (22), multiple optional conductive pins (25) and an optional light mixer (23). The stand (21) has a front surface and a rear surface. The stand (21) is metal that has good heat conductivity. The front surface faces the rear of the body, and the LED chips (22) are mounted on the front surface of the stand (21) and correspond to the penetrating hole (12). Therefore, the LED chips (22) are inside the reflector (10). The conductive pins (25) are mounted on the rear surface of the stand (21) and are connected electronically to corresponding LED chips (22). Since the stand (21) is metal, heat from the LED chips is conducted to the reflector (10) through the stand (21). The LED chips (22) are in at least two different colors.

The light mixer (23) is mounted on the LED chips (22).

The bulb cover (30) covers the reflector (10) and has a cover body and a controlling circuit board (31). The cover body covers the rear of the body of the reflector so the LED module (20) is held inside the cover body and has a rear face. The controlling circuit board (31) is mounted inside the cover body, is held inside the cover body by the cover body and has a front, a rear, an optional electrical connector (32), an infrared sensor (33) and a lamp joint (34). The electrical connector (32) is mounted on the front of the controlling circuit board (31). The multiple conductive pins (25) on the rear side of the stand (21) can connect electronically directly to the controlling circuit board (31) or plug into the electronic connector (32) on the front of the controlling circuit board (31). The infrared sensor (33) is mounted on the front of the controlling circuit board (31) and is aligned with the light guide hole (13) of the reflector (10). The lamp joint (34) is mounted on rear of the controlling circuit board (31) and goes through the cover body to connect electronically to an external power source.

Figure 2:
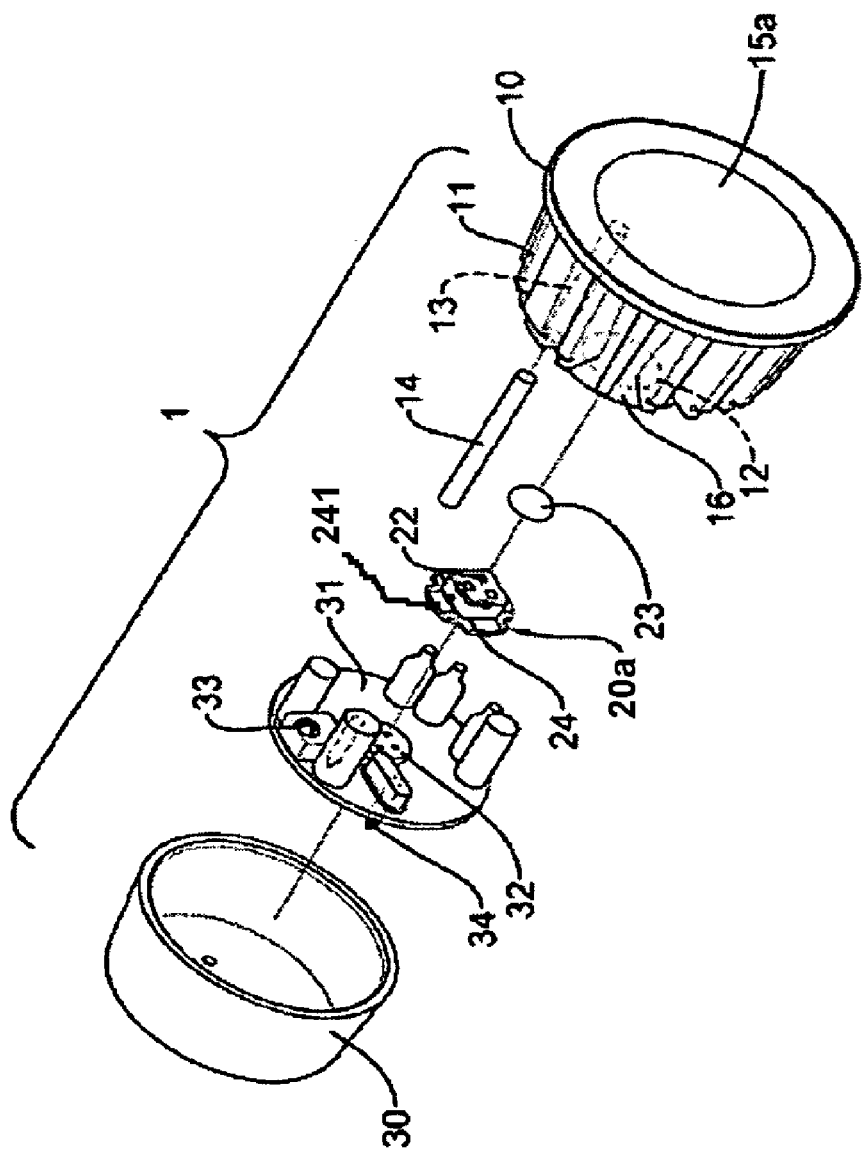
FIG. 2 is an exploded perspective view of an embodiment of a LED color bulb in accordance with the present invention.

With reference to FIG. 2, a second embodiment of a high power LED color bulb (1) in accordance with the present invention is similar to the first embodiment, but an LED module (20a) in the second embodiment is different from the LED module (20) in the first embodiment. The LED module (20a) has a stand (24) and multiple LED chips (22). The stand (24) has a front side and multiple contacts (241). The front side faces the reflector joint (16) and is aligned with the penetrating hole (12). The multiple contacts (241) are formed on the front side of the stand (24) but are isolated from the stand (24). The contacts (241) are connected electronically to the controlling circuit board (31). The LED chips (22) are mounted on the front side but are isolated from the stand (24) and are connected electronically to corresponding contacts (241). When the LED module (20a) is mounted on the reflector joint (16), the LED chips (22) are inside the reflector (10).

Figure 7:
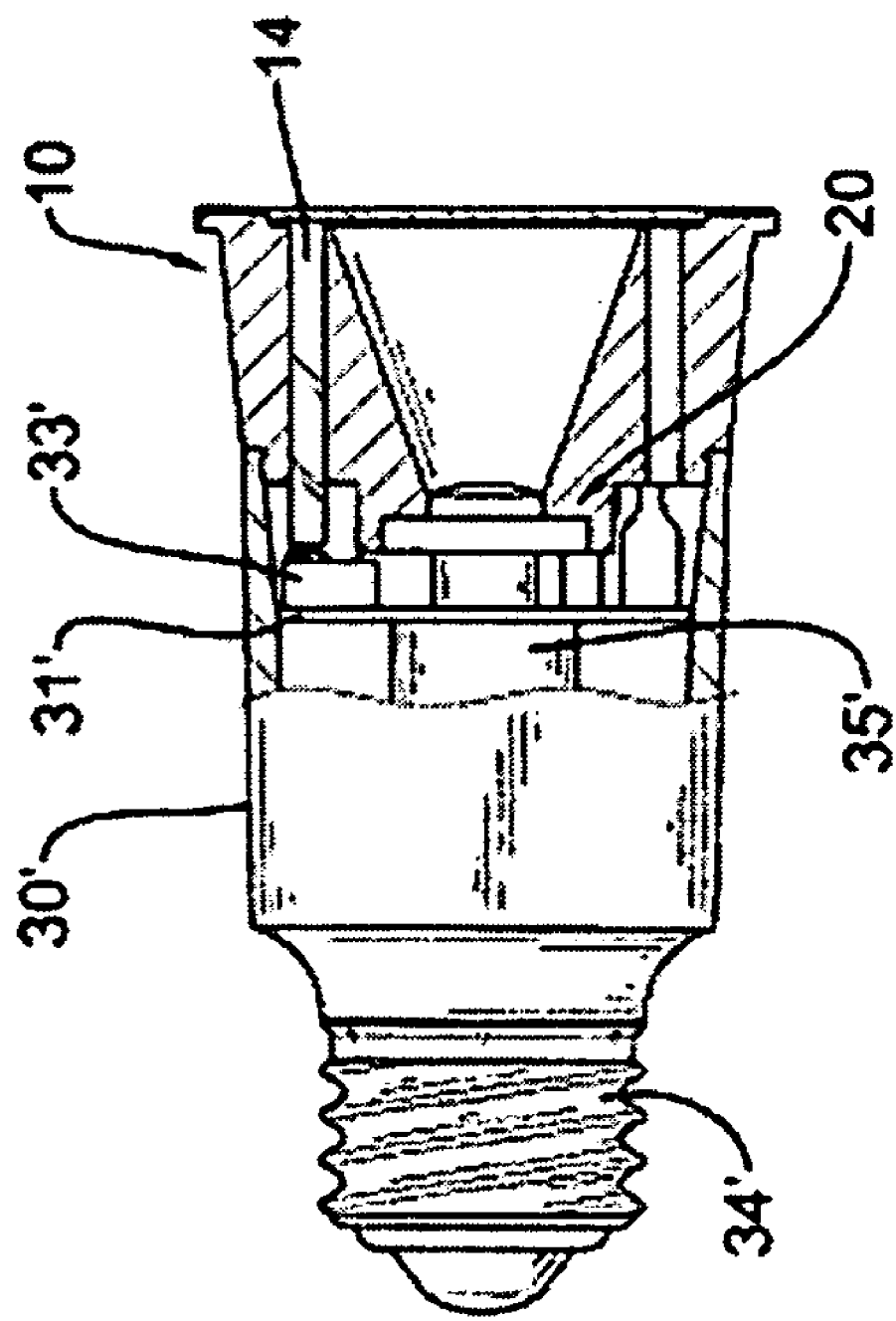
FIG. 7 is a side view in partial section of a third embodiment of a high power LED color bulb in accordance with the present invention.

With reference to FIG. 7, a third embodiment of an LED color bulb in accordance with the present invention is similar to the first embodiment, but a bulb cover (30') is different from the bulb cover (30) of the first embodiment. The bulb cover (30') has a cover body, a controlling circuit board (31') and an AC to DC adapter (35'). The cover body further has a threaded plug (34'). The threaded plug (34') is formed on and protrudes from the rear face of the cover body, screws into an AC power socket (not shown) and has two electrodes. The electrodes conduct electricity from the AC power socket. The controlling circuit board (31') is mounted in the cover body. The AC to DC adapter (35') is mounted in the cover body and is connected electronically to the controlling circuit board (31') and the two electrodes of the threaded plug (34') of the cover body.

Figure 3:
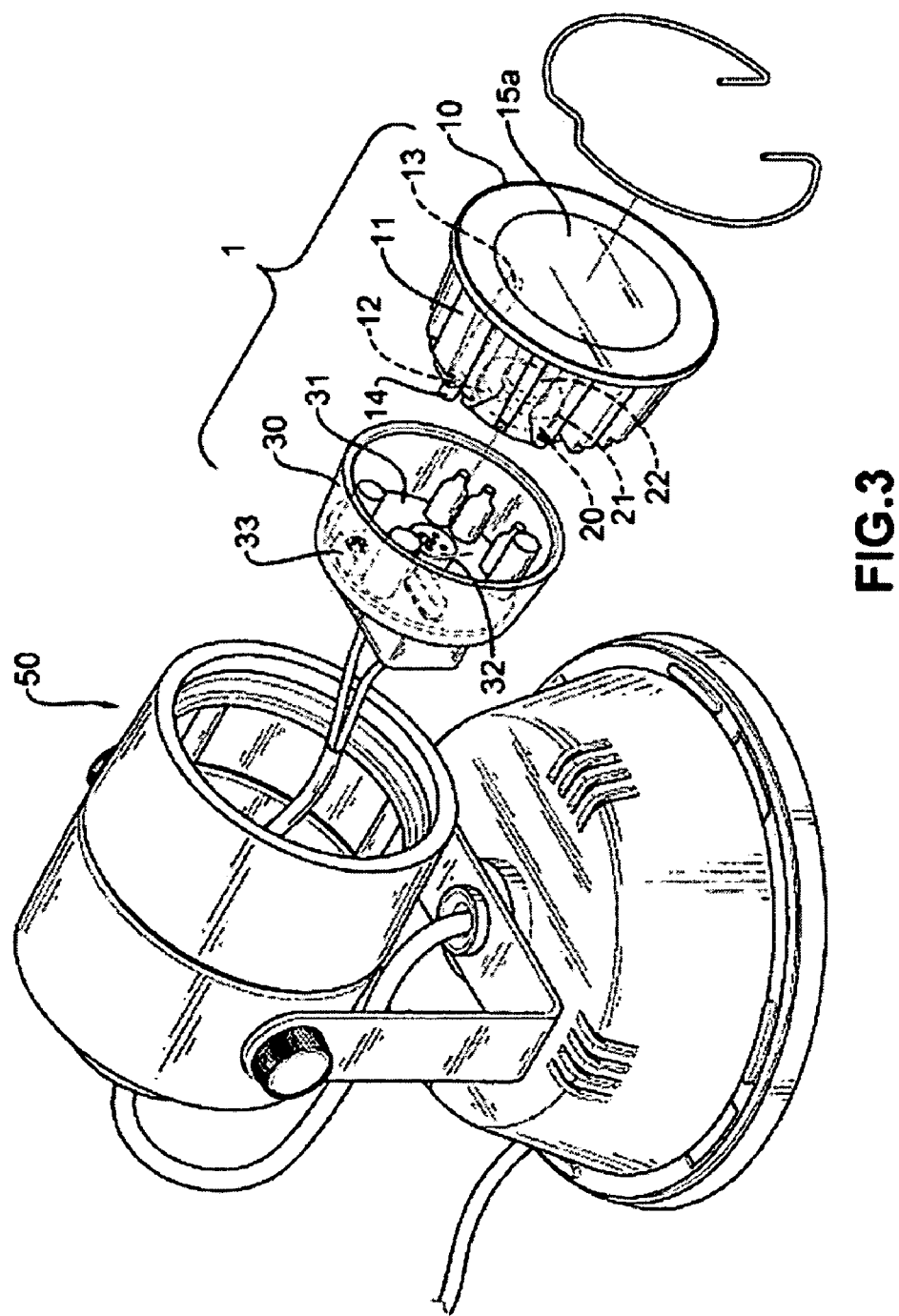
FIG. 3 is an exploded perspective view of a projecting lamp with the high power LED color bulb of FIG. 1.
Figure 4:
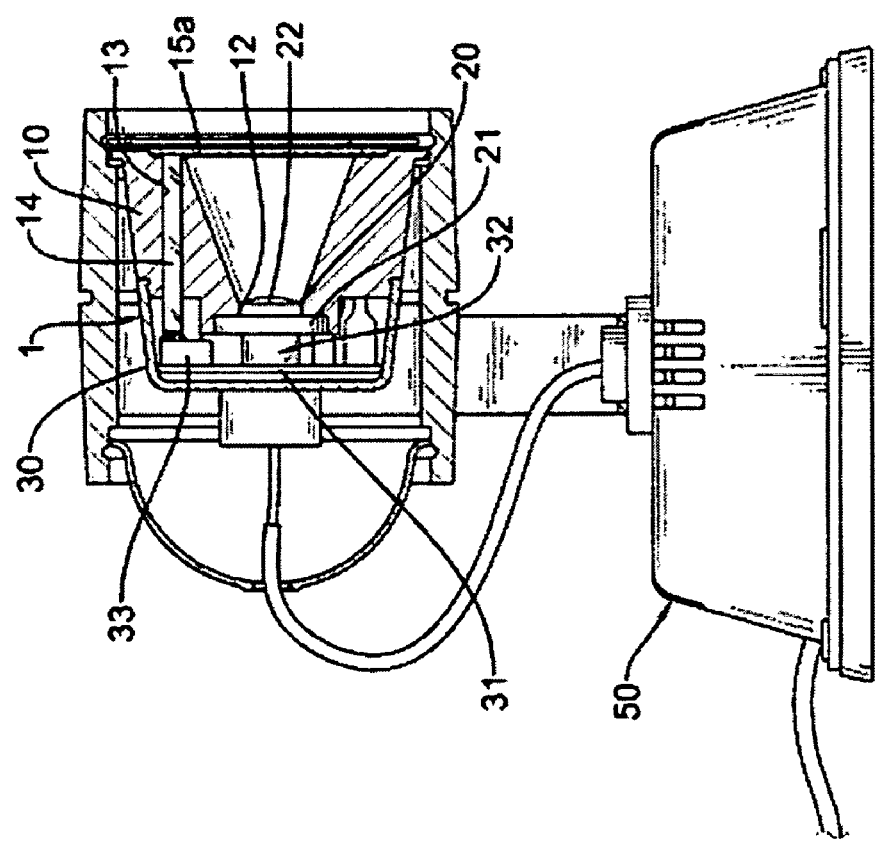
FIG. 4 is a side view in partial section of the projecting lamp in FIG. 3.
Figure 6:
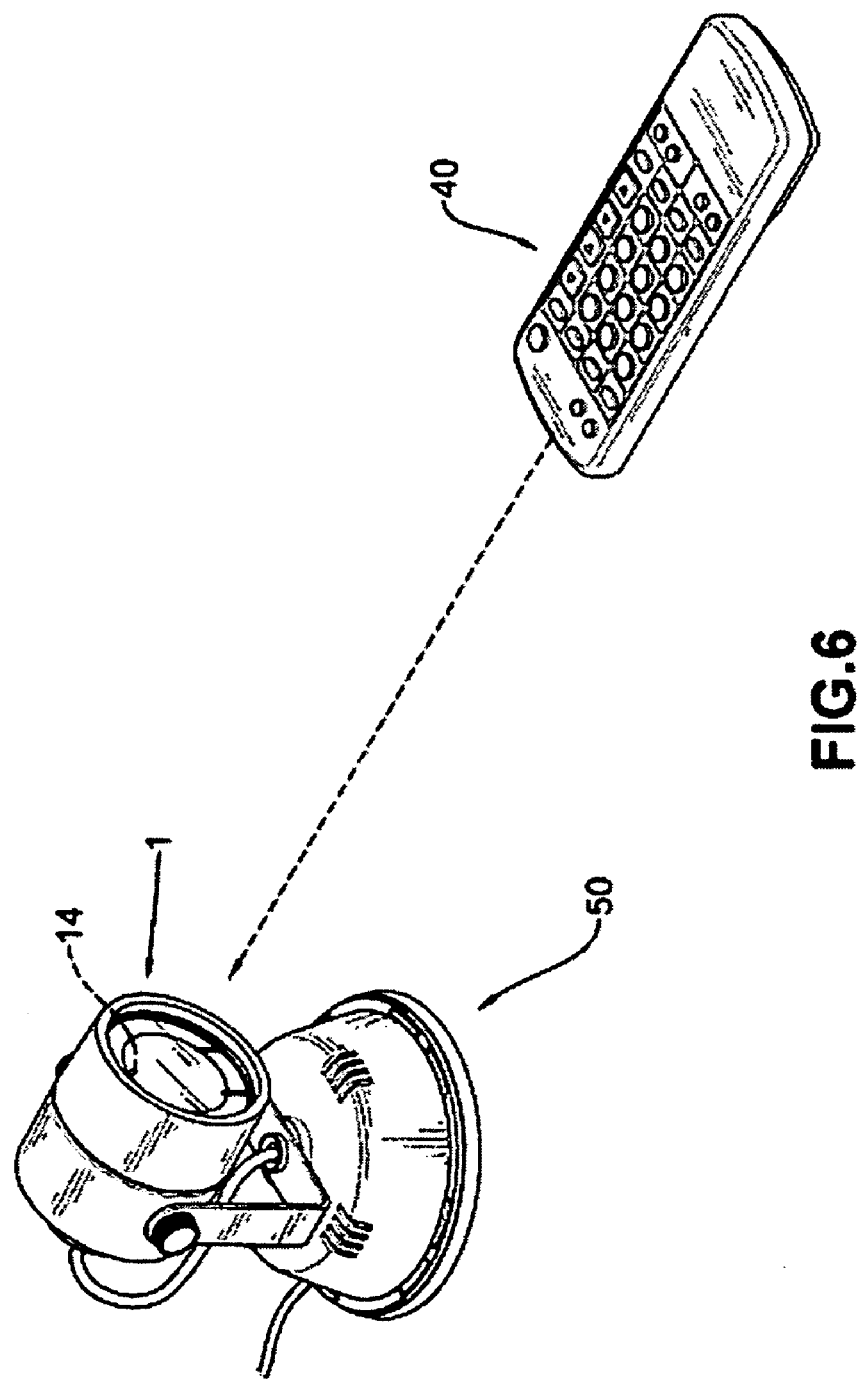
FIG. 6 is an operational perspective view of the projecting light in FIG. 4 and an infrared remote control.
Figure 8:
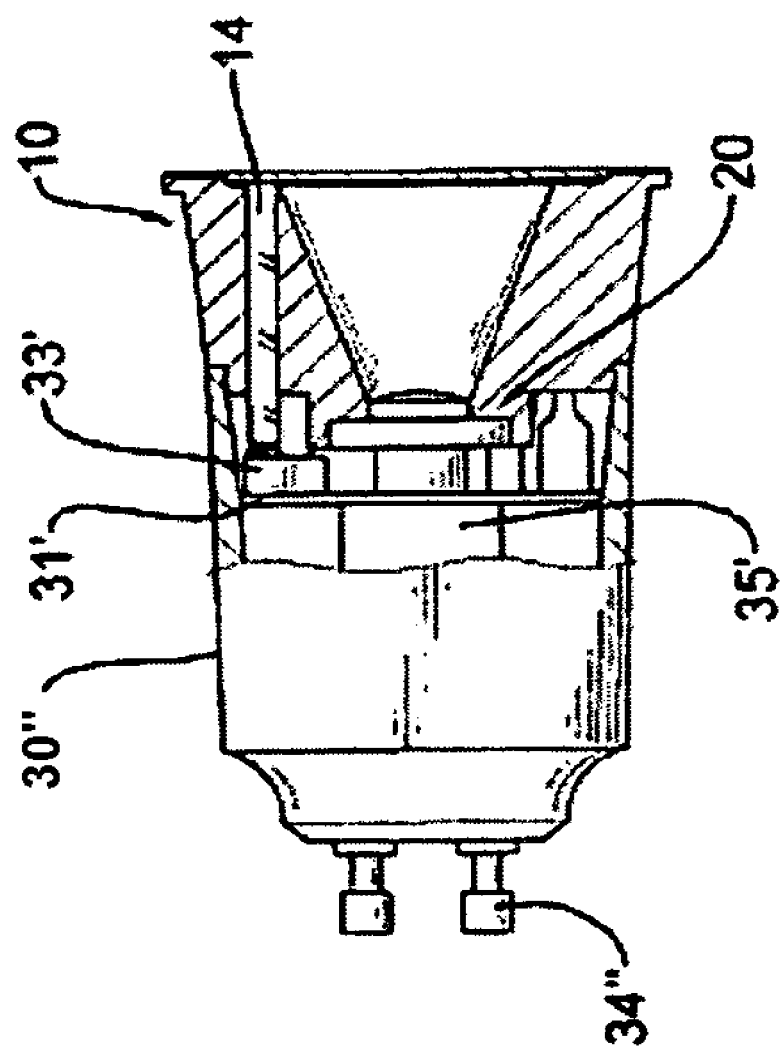
FIG. 8 is a side view in partial section of a fourth embodiment of a high power LED color bulb in accordance with the present invention.

With reference to FIG. 8, a fourth embodiment of an LED color bulb in accordance with the present invention is similar to the third embodiment, but a bulb cover (30") is different from the bulb cover (30') of the third embodiment. The bulb cover (30") has a cover body, a controlling circuit board (31'), an AC to DC adapter (35') and two T-shaped terminals (34"). The cover body has a rear end. The T-shaped terminals (34") pass through the rear end of the cover base and electronically connect to the AC to DC adapter (35') inside the cover body. With reference to FIGS. 3 to 5, a projecting lamp is mounted on a ceiling or a wall and has a lamp seat (50) and a high power LED color bulb (1) in FIG. 1. The lamp seat (50) has a front opening. The high power LED color bulb (1) is mounted in the lamp seat (50) through the front opening. Thus, people can use an infrared remote controller (40) to turn the high power LED color bulb (1) on or off. With reference to FIG. 6, when the infrared remote controller (40) transmits an infrared signal to the projecting lamp, the infrared signal is received by the infrared sensor (33) behind the reflector (10) through the light guide hole (13) or light guide bar (14). Therefore, the controlling circuit board (31) drives the LED chips (22) based on the infrared signal from the infrared remote controller (40).

In the present invention, the infrared sensor (33) is behind the reflector (10), so the infrared sensor (33) is shielded from heat radiated from the LED chips (22). Moreover, using the light guide bar (14) provides a precise path to the infrared light and ensures that the infrared remote function operates regularly. In addition, the invention provides a good heat radiation function by using the reflector (10) and the stand (21) that have good heat conductivity and dissipate the heat from the LED chips (22) when it is emitting light.

Based on the foregoing description, the infrared sensor is behind the reflector and aligned with the light guide hole of the reflector. Therefore, the infrared sensor will not be burnt out by heat produced by the high power LED chips inside the reflector and works normally. Further, the infrared sensor does not have to be replaced simultaneously with the color bulb.

The invention claimed is:

1. A high power LED color bulb with an infrared remote function comprising
   a reflector having:
      a body having
         a front;
         a rear; and
         a front opening;
      a reflecting inside;
      a reflector joint being formed on the rear of the body and having a central penetrating hole; and
      a light guide hole being defined through the body from the front to the rear;
   a light guide bar received inside the light guide hole;
   an LED module being mounted onto the reflector joint and having
      a stand having
         a front surface facing the rear of the body of the reflector; and
         a rear surface; and
      multiple LED chips mounted on the front surface of the stand and correspond to the penetrating hole; and
   a bulb cover covering the reflector and having
      a cover body holding the LED module in the cover body and having a rear face; and
      a controlling circuit board being mounted inside the cover body, being connected electronically to the LED chips of the LED module and having
         a front facing to the rear side of the stand of the LED module; and
         a rear;
      an infrared sensor being mounted on the front of the controlling circuit board and aligning with the light guide bar of the reflector; and
      a lamp joint being mounted on the rear of the controlling circuit board and going through the cover body.

2. The high power LED color bulb as claimed in claim 1, wherein
   the cover body further has a threaded plug formed on and protruding from the rear face of the cover body and having two electrodes; and
   an AC to DC adaptor mounted in the cover body of the bulb cover and connected electronically to the two electrodes of the threaded plug and the controlling circuit board.

3. The high power LED color bulb as claimed in claim 1, or 2, or further comprising a light mixer mounted on the LED chips.

4. The high power LED color bulb as claimed in claim 1, or 2, wherein
   the controlling circuit board further has an electrical connector mounted on the front of the controlling circuit board; and the LED module further has multiple conductive pins mounted on the rear surface of the stand, being connected electronically to corresponding LED chips and plugging into the electrical connector.

5. The high power LED color bulb as claimed in claim 1, or 2, wherein the reflector is made of metal and further has multiple radiator fins formed outside the body of the reflector.

6. The high power LED color bulb as claimed in claim 1, or 2, wherein the reflector further has a penetrating light sheet covering the front opening of the body of the reflector.

7. The high power LED color bulb as claimed in claim 1, or 2, wherein the stand is metal and is screwed to the rear of the body of the reflector.

* * * * *